United States Patent [19]

Hönl

[11] Patent Number: 4,483,495
[45] Date of Patent: Nov. 20, 1984

[54] MECHANISM FOR BLOCKING A ROLL-UP DEVICE FOR SAFETY BELTS

[75] Inventor: Wolf-Dieter Hönl, Schwäbisch Gmünd, Fed. Rep. of Germany

[73] Assignee: Repa Feinstanzwerk GmbH, Alfdorf, Fed. Rep. of Germany

[21] Appl. No.: 444,090

[22] Filed: Nov. 24, 1982

[30] Foreign Application Priority Data

Nov. 30, 1981 [DE] Fed. Rep. of Germany ....... 3147376
Feb. 16, 1982 [DE] Fed. Rep. of Germany ....... 3205515

[51] Int. Cl.³ ...................... A62B 35/02; B65H 75/48
[52] U.S. Cl. ............................................. 242/107.4 A
[58] Field of Search ................ 242/107.4 A, 107.4 B; 280/806; 297/478

[56] References Cited

U.S. PATENT DOCUMENTS

| | | | |
|---|---|---|---|
| 3,578,260 | 5/1971 | Kell | 242/107.4 A |
| 3,834,646 | 9/1974 | Heath | 242/107.4 A X |
| 3,930,622 | 1/1976 | Tanaka et al. | 242/107.4 A |
| 4,029,267 | 6/1977 | Slipper | 242/107.4 A |
| 4,053,117 | 10/1977 | Takada | 242/107.4 A |
| 4,187,995 | 2/1980 | Rex | 242/107.4 A |
| 4,190,213 | 2/1980 | Ueda | 242/107.4 A |

Primary Examiner—John M. Jillions
Attorney, Agent, or Firm—Yount & Tarolli

[57] ABSTRACT

Mechanism for blocking a belt shaft of a roll-up device for a safety belt in a vehicle characterized by the features that the control pawl is pivoted in the stationary roll-up housing of the mechanism in the tangential direction range to the pitch circle of the teeth, can be swung with the detent tip of the control pawl by positioning means of the danger sensor into the range of the teeth of the control disc, can be swung further upon rotation of the control disc toward the tooth base by a pulling force on the safety belt against the detent tip with the latter, taking along the blocking pawl into the area of the ratchet wheel teeth and can be moved, at least in the range of its tip, against an elastic force by a pulling force on the safety belt transmitted via the cam of the control disc where if a tooth of the control disc is struck by the tip of the control pawl, a distance between the next tooth of the ratchet wheel is provided by mechanical design to ensure engagement of the blocking pawl with the teeth of the ratchet wheel.

3 Claims, 9 Drawing Figures

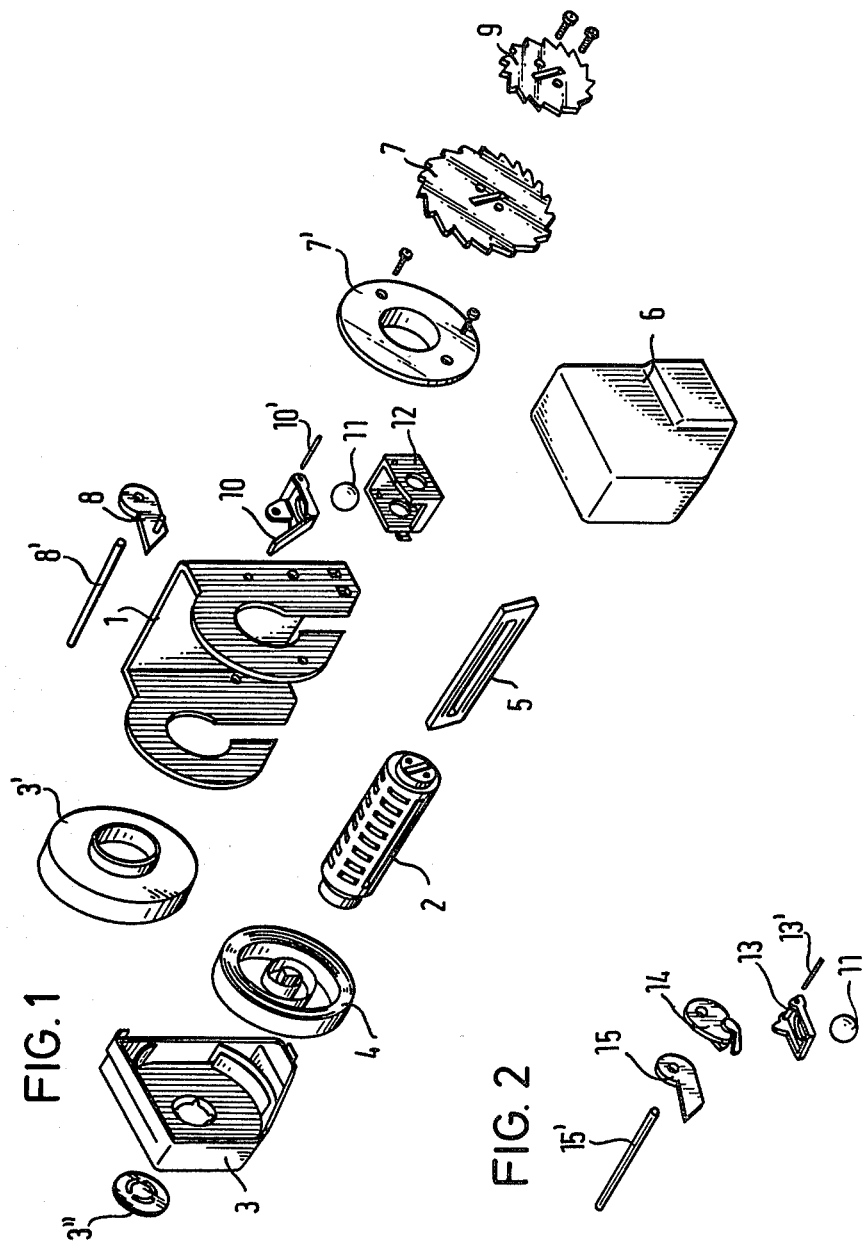

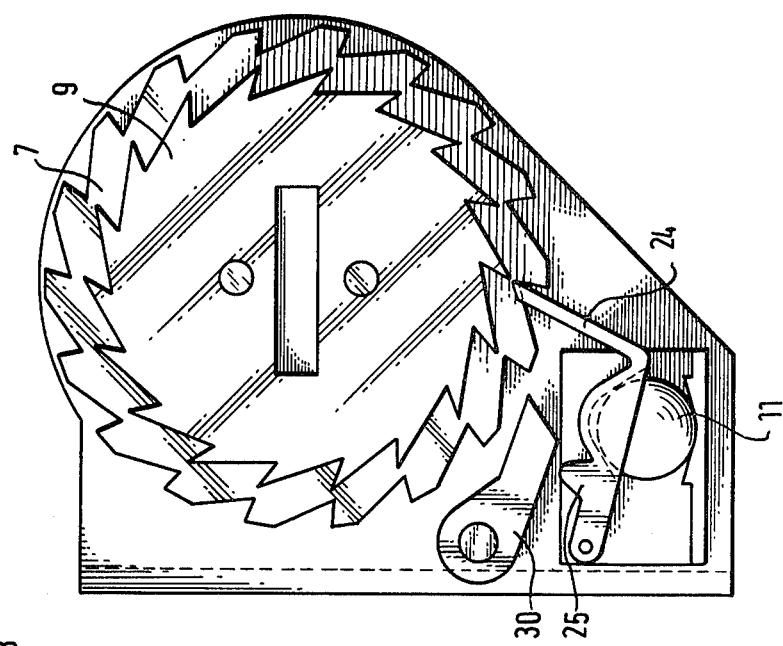
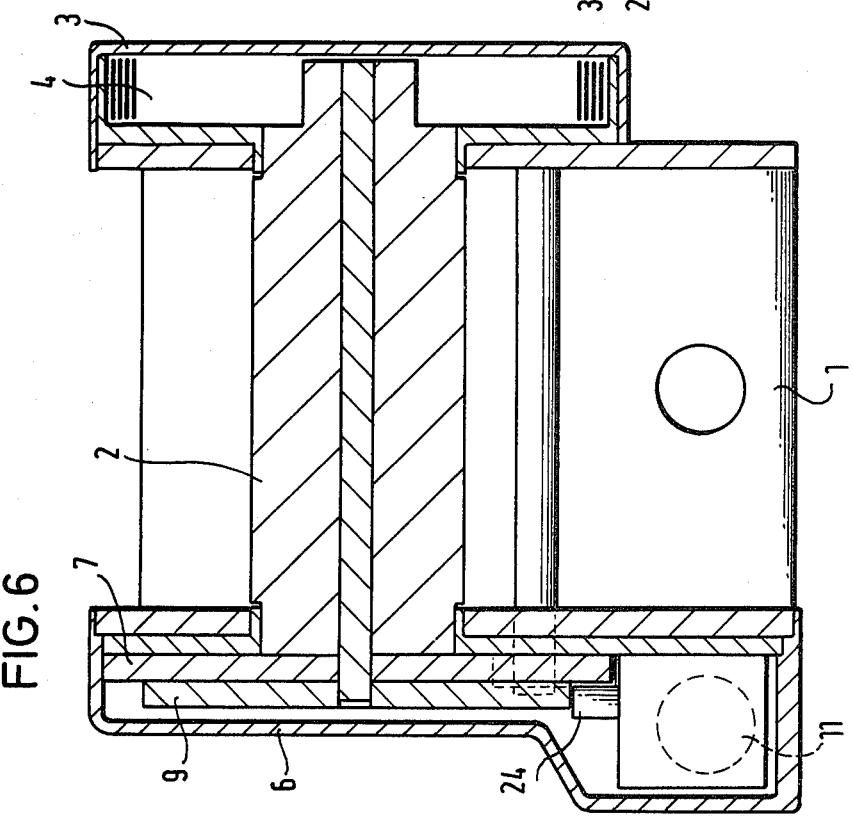

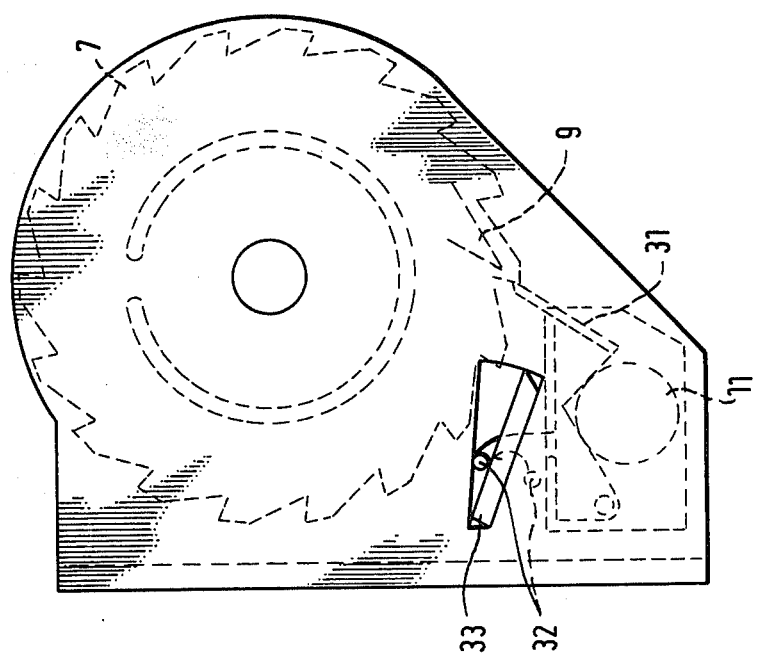
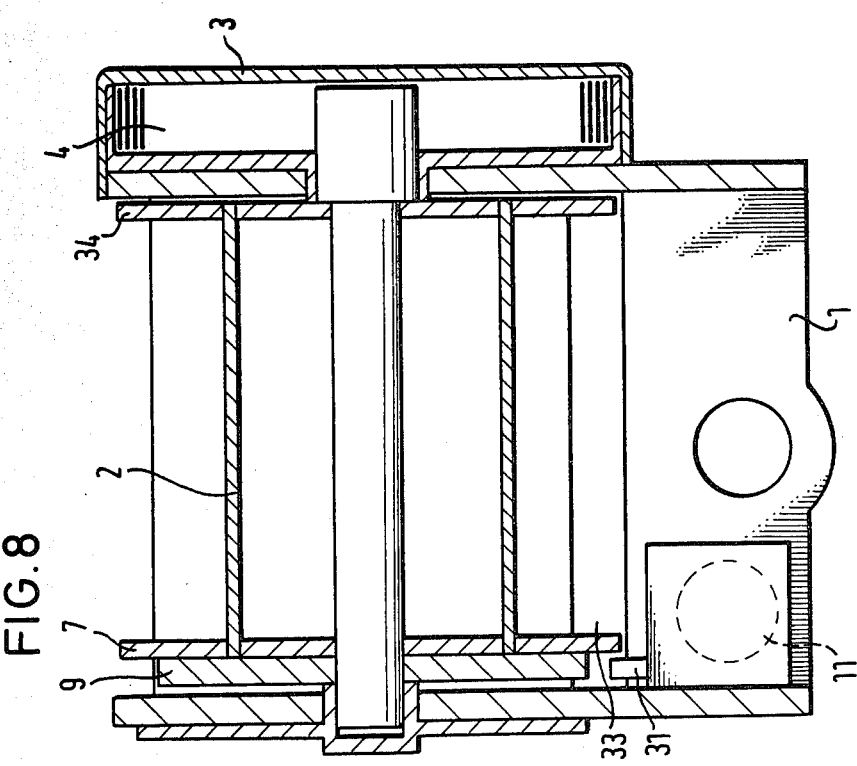

MECHANISM FOR BLOCKING A ROLL-UP DEVICE FOR SAFETY BELTS

BACKGROUND OF THE INVENTION

1. Field of the Invention

The present invention relates to a mechanism for blocking a roll-up device for safety belts in motor vehicles responsive to a danger sensor reacting to a dangerous situation. The roll-up device has a ratchet wheel firmly connected to the belt shaft and a blocking pawl which can be swung into the tooth area of the former, as well as a control pawl which, in conjunction with a control disc is arranged as a control between the danger sensor and the blocking pawl. The control disc and the ratchet wheel are rigidly connected to each other and have the same number of teeth.

2. Description of the Prior Art

In motor vehicles, safety belts are used to protect the passengers from injuries due to an accident. The safety belts are connected, on one side, to a mechanism for rolling-up the safety belt and holding it taut. Into this mechanism is built a device which is capable of blocking this mechanism and thereby also the safety belt in the event of an extreme acceleration or deceleration force normally occurring in accidents which acts on the motor vehicle or the motor vehicle passenger and actuates a built-in danger sensor. The danger sensor senses additional dangerous situations independent of sudden speeding and stopping, such as tilting of the motor vehicles which may result in overturning the vehicle, or in crashes in which the vehicle is traveling at a legal speed or even standing still.

In the simplest embodiment, the blocking process can be effected by having the danger sensor act directly on a pawl which drops into the region of the teeth of a ratchet wheel firmly arranged on the belt shaft. This simple design and operation has the disadvantage that the dropping-in motion of the pawl into the teeth of the ratchet wheel can take place independently of the respective rotational position of the ratchet wheel relative to the pawl. Therefore, the danger exists that the pawl falls only or very frequently on the top region of a tooth of the ratchet wheel, and the large forces to be intercepted are conducted via this narrow top region. This leads to heavy wear, if not to destruction of the pawl and the teeth of the ratchet wheel.

Therefore, devices have contrived for the purpose of counteracting this shortcoming. Normally, an intermediate mechanism is built-in between the danger sensor and the blocking pawl for blocking the ratchet wheel and thereby the belt shaft. The intermediate mechanism controls the blocking pawl such that it drops into the teeth of the ratchet wheel at the instant which ensures that the entire active area of the blocking pawl and the respective tooth of the ratchet wheel will be fully engaged when the force is transmitted. For this purpose, a control pawl is normally used which acts on a control disc which, in turn, controls the dropping-in motion of the blocking pawl.

German Published Non-Prosecuted application DE-OS 30 06 177 discloses a locking device for safety belt roll-up devices, especially for motor vehicles, in which the cam (control disc) and ratchet wheel rigidly connected to each other have the same number of teeth. The control lever is arranged with its area of engagement into the cam and with its stationary fulcrum radially to the cam. A pawl can be swung into the teeth of the ratchet wheel via a driver extension at this control lever, if the control lever is swung by a danger sensor into the teeth of the control disc and is continued in its swing by the rotation carried out via the control disc. This embodiment requires considerable space.

SUMMARY OF THE INVENTION

An object of the invention is to provide a control mechanism for blocking the roll-up device for a safety belt if danger is indicated; which control mechanism is of simple and space-saving design; is free as possible of maintenance in operation and, in particular, is extremely reliable and quick to react in its operation.

With the foregoing and other objects in view, there is provided in accordance with the invention a mechanism for blocking a belt shaft of a roll-up device for a safety belt in a vehicle having a stationary housing, the belt shaft rotatably supported in the housing, the safety belt rolled around the belt shaft, a danger sensor which becomes activated when the vehicle is in a dangerous situation, said mechanism comprising a ratchet wheel connected to the belt shaft to rotate with the belt shaft, blocking pawl pivoted to swing into the tooth area of the ratchet wheel, a control disc having the same number of teeth as the ratchet wheel and rigidly connected to the latter, a control pawl for engagement with the teeth of the control disc when activated by the danger sensor, said control pawl pivoted on the stationary roll-up housing in the tangential range of direction to the tooth pitch diameter of the control disc such that the control pawl tip can be swung into the area of the teeth of the control disc, said danger sensor having positioning means adjacent the control pawl for swinging the control pawl tip into the area of the teeth of the control disc, said control pawl tip being moved further in the direction toward the base of the tooth of the control disc upon rotation of the control disc by a pulling force on the safety belt against the control pawl tip, said blocking pawl disposed along the path of the control pawl during said further movement to move the blocking pawl into the region of the ratchet wheel teeth, said teeth of the ratchet wheel being spaced with sufficient distance between adjacent teeth to assure engagement of the blocking pawl with the teeth of the ratchet wheel.

Other features which are considered as characteristic for the invention are set forth in the appended claims.

Although the invention is illustrated and described herein as embodied in mechanism for blocking a roll-up device for safety belts, it is nevertheless not intended to be limited to the details shown, since various modifications may be made therein without departing from the spirit of the invention and within the scope and range of equivalents of the claims.

BRIEF DESCRIPTION OF THE DRAWINGS

The invention however, together with additional objects and advantages thereof will be best understood from the following description when read in connection with the accompanying drawings, in which:

FIG. 1 shows an exploded perspective view of the belt roll-up mechanism in accordance with the invention;

FIG. 2 is an exploded perspective view of a portion of the belt roll-up mechanism in another embodiment of the invention;

FIGS. 5 and 6 show a front view and a side view of a modified embodiment of the belt roll-up mechanism;

FIGS. 7 and 8 show a front view and a side view of another modified embodiment of the belt roll-up mechanism.

DETAILED DESCRIPTION OF THE INVENTION

Figure 3:
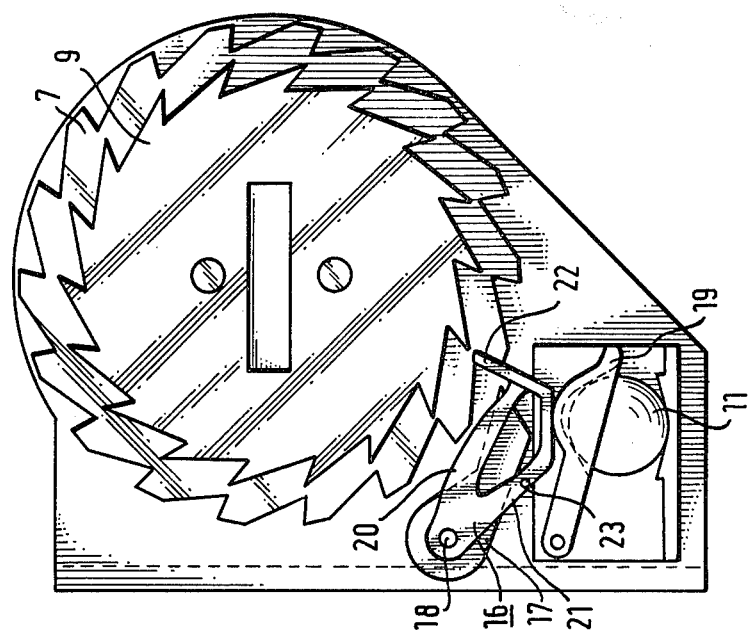
FIGS. 3 and 4 show a front view and a side view of a belt roll-up mechanism.

According to the invention, a mechanism which meets these requirements to a very high degree is characterized by the features that the control pawl is pivoted in the stationary roll-up housing of the mechanism in the tangential direction range to the pitch circle of the teeth, can be swung with the detent tip of the control pawl by positioning means of the danger sensor into the range of the teeth of the control disc, can be swung further upon rotation of the control disc toward the tooth base by a pulling force on the safety belt against the detent tip with the latter, taking along the blocking pawl into the area of the ratchet wheel teeth and can be moved, at least in the range of its tip, against an elastic force by a pulling force on the safety belt transmitted via the cam of the control disc where if a tooth of the control disc is struck by the tip of the control pawl, a distance between the next tooth of the ratchet wheel is provided by mechanical design to ensure engagement of the blocking pawl with the teeth of the ratchet wheel.

A mechanism for blocking the roll-up device for safety belts designed with the features of the invention has the desired advantage of simplicity and space-saving, of reliable operation and basically without maintenance and with high response speeds. This is essentially achieved by firmly connecting the control disc and the ratchet wheel to each other and so form a unit, together with initiating the dropping-in motion of the blocking pawl into the area of the teeth of the ratchet wheel, directly by the control pawl and controlling the blocking pawl with the correct phase relative to the position of the ratchet wheel. In realizing the mechanism according to the invention, attention must be given that the geometric aspects to be used are taken into consideration in the mechanical design. It is important if the control pawl and a tooth of the control disc are opposite each other, that the blocking pawl and the next tooth of the ratchet wheel have sufficient distance from each other to secure an assured engagement of the blocking pawl with the teeth of the ratchet wheel.

The operation of the mechanism equipped with the features of the invention is particularly advantageous because the positioning means of the danger sensor need to transmit only extremely small positioning forces and can therefore react quickly without reaction giving reliable operation and also because the engaging force for moving the blocking pawl into the teeth of the ratchet wheel is derived from the pulling force which is transmitted in the event of danger by the safety belt to the control disc and the control pawl.

The control pawl is swung into the region of the tops of the teeth of the control disc by the danger sensor. The control forces required for this purpose can therefore be very small, since the control pawl does not have to take up appreciable forces and may therefore have a small mass. The control pawl engaged by a tooth flank is pulled-in by a rotary motion of the control disc, which is exerted by a pull on the safety belt in the event of danger, in the direction toward the center of the control disc. As a result of this motion, the blocking pawl is also swung into the teeth of the ratchet wheel. If a further pull is exerted via the belt, there is elastical deformation, so that the flanks of the blocking pawl and of the teeth of the ratchet wheel come into contact with each other. In this manner, the blocking comes about.

According to a preferred embodiment, the mechanism according to the invention is characterized by the feature that the control pawl has a region which is elastically deformable. Preferably, this elastically deformable region of the control pawl is located on one side of a plane defined by the pivoting axis and the point of engagement into the control disc teeth. This measure makes the mechanism particularly simple and cost-effective production-wise and also meets the requirements for simple assembly and reliable operation free of maintenance. If the control pawl is engaged into the teeth of the control disc as a result of activation by the danger sensor and if a pulling force acts via the safety belt, then the shape of the control pawl is changed in its region which is elastically deformable. This leads to the situation in which the blocking pawl comes into contact with the next-following tooth of the ratchet wheel and blocks the latter.

The ratchet wheel may be made of material which can be stressed highly by the action of force, and the control disc connected thereto made of wear-resistant plastic. In this connection, the ratchet wheel is preferably made by a stamping process while the control disc made of plastic can be produced by injection molding and optionally may be molded directly onto the ratchet wheel.

The ratchet wheel and the control disc may be formed from a single serrated wheel. The engagement zones of this wheel with that of the blocking pawl and the control pawl are tooth regions located laterally side by side.

As a further variant, it is also possible within the scope of the mechanism according to the invention to form the detent wheel and the control disc of a single serrated wheel. The engagement zones of the blocking pawl and the control pawl can be swung into zones of successive teeth of this wheel. In the last two cases, the requirement already applies that by an offset obtainable by design, of the control pawl on the one hand and of the blocking pawl on the other hand, relative to the next reachable tooth flank of the bifunctional wheel, the sequence of engagement in time of the control pawl and the blocking pawl is ensured.

Any danger sensor can be used capable of evaluating an unambiguous indication of a dangerous situation. In the present case, an inertial mass which changes its position if an acceleration limit is exceeded and through whose change of position the control disc can be swung into the teeth of the control disc, is the preferable danger sensor. Thereby, a compact structure capable of reacting to a danger situation quickly is obtained.

According to a further embodiment, the mechanism according to the invention is characterized by the feature that a control gate is arranged between the control organ of the danger sensor and the control pawl. Thereby in the driving process, the control gate travels upward and takes along the control pawl resting thereon until the latter engages the teeth of the control disc securely. In this manner, a free run is provided between the gate and the bearing post. If more belt is pulled off and the shaft is rotated further thereby, the blocking pawl is urged via the control pawl by the control wheel, so that the blocking pawl is securely engaged in the teeth of the detent wheel. With this sensor arrangement, the control gate then drops back into its starting position and has no tension. In addition, a larger range of angle positions can be covered by the separate system: control gate on the one hand and control pawl on the other hand.

In accordance with the invention the blocking device may have the blocking pawl and the ratchet wheel on one side of the belt shaft or one ratchet wheel each on both sides of the belt shaft in the axial direction of which one ratchet wheel forms a structural unit with the control disc. The blocking pawls forming a unit can be rotated jointly by the control pawl.

Embodiment examples designed in accordance with the invention will be described in greater detail in the following.

Referring to FIG. 1, the belt shaft 2, to which the safety belt is fastened and on which the latter can be wound up, is supported rotatably in a roll-up housing 1 which is fastened in the vehicle. On one side of roll-up housing 1 is arranged a roll-up or drive spring 4 which is protected by a roll-up spring shell 3 which includes inner cover 3' and outer cap 3". The spring 4 functions by pulling the belt shaft 2 in the roll-up direction of the belt via a shaft plate 5. On the side of the roll-up housing 1 opposite the roll-up spring 4, the blocking mechanism and the danger sensor are arranged inside a further roll-up shell 16.

The main components of the blocking mechanism are a ratchet wheel 7 which is connected to the belt shaft 2 via the shaft plate 5 secured against rotation, and a blocking pawl 8 with shaft 8' which can be swung into the teeth area of the former, as well as a control disc 9 and a control pawl 10 with pin 10' cooperating with the teeth thereof. The control disc 9 and the ratchet wheel 7 are connected firmly to each other and have the same number of teeth. Also shown is support plate 7'.

The danger sensor has a spherical mass 11 supported in a sensor housing 12 and can move laterally in the event of accelerations and decelerations and thereby swings the control pawl 10 via inclined surfaces into the teeth of the control disc 9.

FIG. 2 likewise shows a danger sensor formed by the spherical mass 11 which in turn acts on the control pawl 15 which shaft 15' via a hinged plate 13 with pin 13' and a control pawl 14.

The operation of the blocking mechanism is illustrated omitting detail for clarity by the presentations in FIGS. 3, 5 and 7.

In FIG. 3 can be seen the ratchet wheel 7 and the control disc 9 with their teeth. The ratchet wheel 7 and the control disc 9 are firmly connected to each other and have the same tooth pitch. The control disc 9 is associated with a control pawl 16, while the blocking pawl 17 is arranged in the vicinity of the ratchet wheel 7. The control pawl 16 as well as the blocking pawl 17 are pivoted on a shaft 18. The spherical mass 11 acts on the control pawl 16 if it is deflected laterally by acceleration forces due to inertia and swings it via hinged plate 19 into the region of the teeth of the control disc 9. The lever-like extension 22 is seized by the next-following tooth of the control disc 9 and rotated by the forces transmitted by the belt via the control disc 9. The leg 20 of the control pawl 16 is made substantially form-stable, while the leg 21 of this control pawl 16 is elastically deformable due to the lever-like extension 22. Through the action of the control disc 9 on the lever-like extension 22 of the control pawl 16, the blocking pawl 17 is swung by a driver pin 23 at the leg 21 of the control pawl 16 into the teeth of the ratchet wheel 7. As will be seen, the distance between the blocking pawl 17 and the next-following tooth of the ratchet wheel 7 is chosen to have enough play available when the lever-like extension 22 of the control lever is seized, to swing the blocking pawl 17 fully into the teeth of the ratchet wheel 7 before it is seized by the next-following tooth of the ratchet wheel 7. Through a further pulling force acting via the safety belt, the control pawl 16 is deformed in its elastic region so that the operating flanks of the blocking pawl 17 and the teeth of the ratchet wheel come into contact and result in blocking.

According to FIG. 5, the spherical mass 11 acts directly on a control pawl 24 which upon being seized by the teeth of the control disc 9 swings the blocking pawl 30 via an extension 25 into the teeth of the detent or ratchet wheel 7.

The spherical mass 11 in the arrangement according to FIG. 7 likewise acts directly on a control pawl 31. Drive pins 32 at control pawl 31 are the means for swinging blocking pawl plate 33. Through the release motion of the control pawl 31 after relief by the control disc 9, the blocking plate 33 is returned to its starting position.

Figure 4:
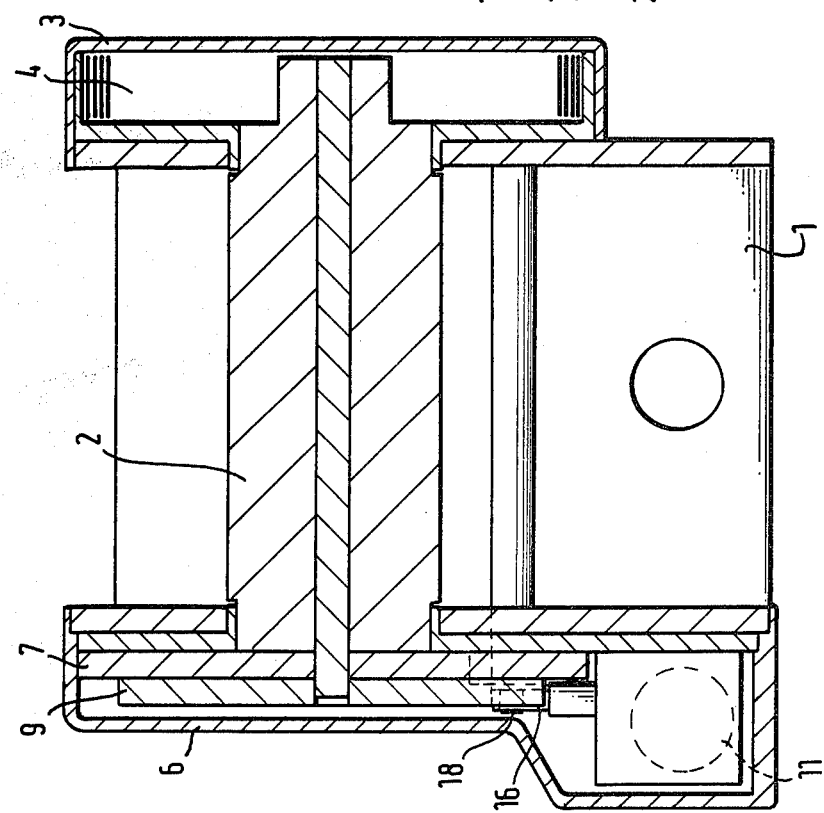

It can be seen from FIG. 4 that in this case the blocking device for the belt shaft 2 is arranged only on one side. For technical reasons related to the bearings, however, the pivot axis 18 for the control pawl 16 and the blocking pawl 17 is fastened in both legs of the housing 1. The design is similar in FIG. 6.

According to FIG. 8 it will be seen that in this case the blocking device is arranged within the side plates of the housing 1. The control disc 9 is firmly connected to the ratchet wheel 7. On the other side of the belt shaft 2, a second ratchet wheel 34 is fastened. Both ratchet wheels 7 and 34 are influenced by the pawl plate 33.

Figure 9:
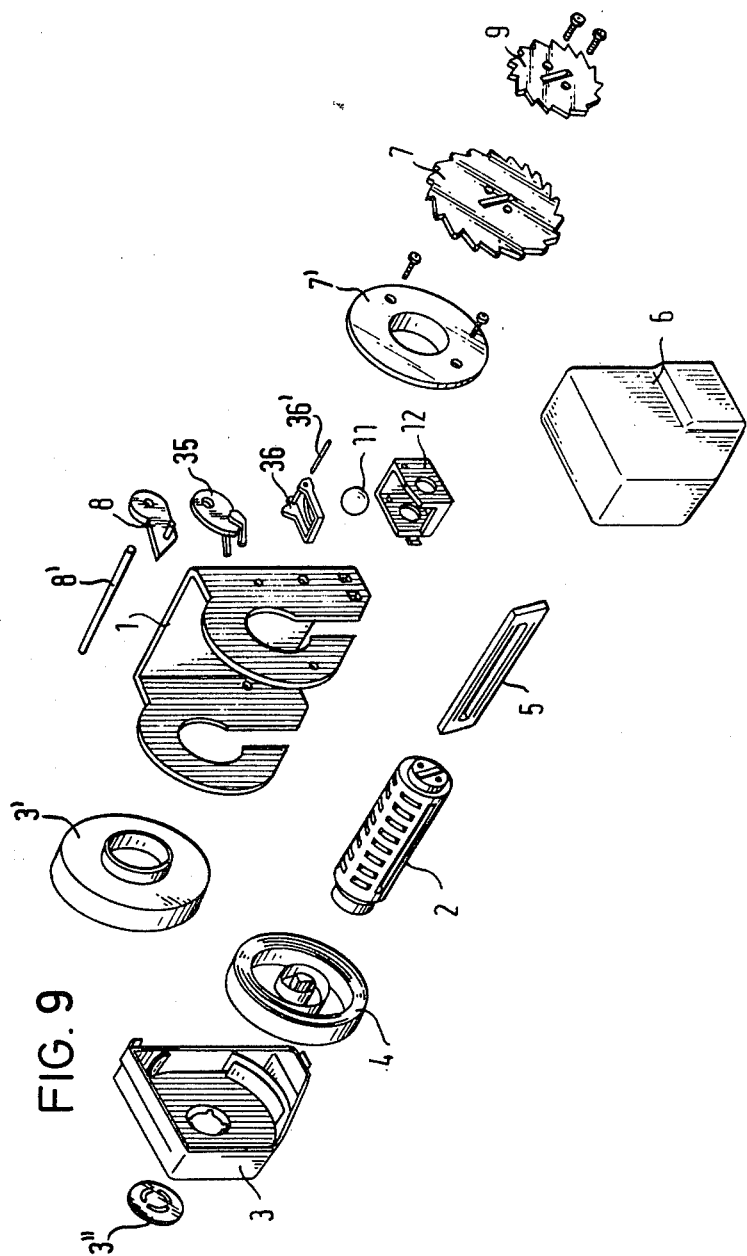
FIG. 9 shows an exploded perspective view of a belt roll-up mechanism with a control gate separate from the control pawl.

FIG. 9 shows a mechanism, most parts of which are the same as in the mechanism according to FIG. 1. The essential difference is that the spherical mass 11 is arranged in the present case under a separate control member 36, which is swung around in the event of danger by the spherical mass 11. The control pawl 35 now lies loosely on this control member 36. If this control pawl 35 is swung by the control member 36 into the region of the control wheel 9, then the operating tip of the control pawl 35 is seized by the pull at the safety belt when the belt shaft 2 is turned and is pulled up, as already described with reference to the preceding figures, with the results that the blocking pawl 8 is swung into the teeth of the ratchet wheel 7. In this arrangement, the control member 36 can now return immediately to its starting position and is not loaded. Due to the separate system of the control member 36 on the one hand and the control pawl 35 on the other hand, a larger range of angular positions can be covered than with a control element that has both functions.

In conjunction with the embodiment according to FIG. 9, it is also possible to use the variants with respect to the pawl design and the form of the belt shaft as described in the preceding figures.

There is claimed:

1. An apparatus for retarding rotation of a safety belt reel, said apparatus comprising a circular array of locking teeth connected with the reel for rotation therewith, a locking pawl engageable with array of locking teeth to block rotation of the reel, a sensor assembly responsive to a predetermined change in vehicle velocity, a circular array of control teeth connected with the reel for rotation therewith, a control pawl movable into engagement with said array of control teeth by said sensor assembly upon the predetermined change in vehicle velocity, said control pawl being resiliently deflectable by said array of control teeth to move said locking pawl from a position spaced from said array of locking teeth into engagement with said array of locking teeth.

2. An apparatus as set forth in claim 1 wherein said array of control teeth are movable under the influence of force applied to the reel by the safety belt to resiliently deflect the control pawl, said control pawl being resiliently flexible from a deflected condition to a non-deflected condition upon interruption of the force applied to the reel by the safety belt to move said array of locking teeth relative to said locking pawl and release said locking pawl for movement to a position spaced from said array of locking teeth.

3. An apparatus as set forth in claim 1 wherein said circular array of locking teeth are movable along a circular path during rotation of the reel, said circular array of control teeth being movable along a circular path during rotation of the reel, said sensor assembly being operable in response to the predetermined change in vehicle velocity to move said control pawl into the path of movement of said control teeth while said locking pawl is disposed radially outwardly of the path of movement of said locking teeth, said control pawl having surface means for engaging one of said control teeth to enable said one control tooth to resiliently deflect said control pawl during continued rotation of the reel and said control teeth after engagement of said surface means with said one control tooth, said control pawl further including means for moving a portion of said locking pawl from a position radially outwardly of the path of movement of said locking teeth to a position in which said portion of said locking pawl is in the path of movement of said locking teeth as said control pawl is resiliently deflected by said one control tooth during continued rotation of the reel.

* * * * *

UNITED STATES PATENT AND TRADEMARK OFFICE
CERTIFICATE OF CORRECTION

PATENT NO. : 4,483,495

DATED : November 20, 1984

INVENTOR(S) : Wolf-Dieter Honl

It is certified that error appears in the above-identified patent and that said Letters Patent is hereby corrected as shown below:

Column 6, line 68, after "with" insert - - the - -.

Signed and Sealed this

Ninth Day of April 1985

[SEAL]

Attest:

DONALD J. QUIGG

Attesting Officer

Acting Commissioner of Patents and Trademarks